United States Patent [19]

Kobayashi et al.

[11] 3,977,021

[45] Aug. 24, 1976

[54] COLOR VIDEO DISC, APPARATUS FOR MAKING THE SAME AND REPRODUCING APPARATUS THEREFOR

[75] Inventors: Yoshikazu Kobayashi; Masachika Harada, both of Kawasaki, Japan

[73] Assignee: Nippon Columbia Kabushiki Kaisha, Tokyo, Japan

[22] Filed: Jan. 21, 1974

[21] Appl. No.: 434,806

[30] Foreign Application Priority Data

Jan. 25, 1973 Japan................................ 48-10550
Jan. 25, 1973 Japan................................ 48-10551

[52] U.S. Cl. ........................... 358/4; 178/69.5 TV; 358/17
[51] Int. Cl.² ...................... H04N 5/76; H04L 7/00; H04N 9/44
[58] Field of Search ..................... 358/4, 8, 9, 17, 6, 358/7; 178/6.6 DD, 69.5 TV; 360/86, 97, 135, 37, 9

[56] References Cited
UNITED STATES PATENTS

| | | | |
|---|---|---|---|
| 3,626,087 | 12/1971 | Tomioka | 358/4 |
| 3,761,604 | 9/1973 | Ozawa et al. | 358/4 |
| 3,852,520 | 12/1974 | Bruch | 358/4 |

*Primary Examiner*—Robert L. Griffin
*Assistant Examiner*—R. John Godfrey
*Attorney, Agent, or Firm*—Hill, Gross, Simpson, Van Santen, Steadman, Chiara & Simpson

[57] ABSTRACT

A color video disc is disclosed in which at least two field synchronizing signals and color video signals are recorded on a track in a line sequence manner. In this case, the first color video signal component in each field is selected to be the same color.

An apparatus for making the above color video disc is also described with which the synchronizing signals and color video signals derived from signal producing circuit are recorded on the color video disc with a cutter device and in which a ⅓ counter is provided. The ⅓ counter serves to supply therethrough an output signal from a synchronizing signal generator to a line sequence signal generator and the output signal is applied to the signal producing circuit.

A reproducing apparatus for the color video disc is described in which the signal reproduced from the color video disc is applied to a signal processing system. This signal processing system does not include a pilot signal extracting circuit which is required in the prior art.

3 Claims, 18 Drawing Figures

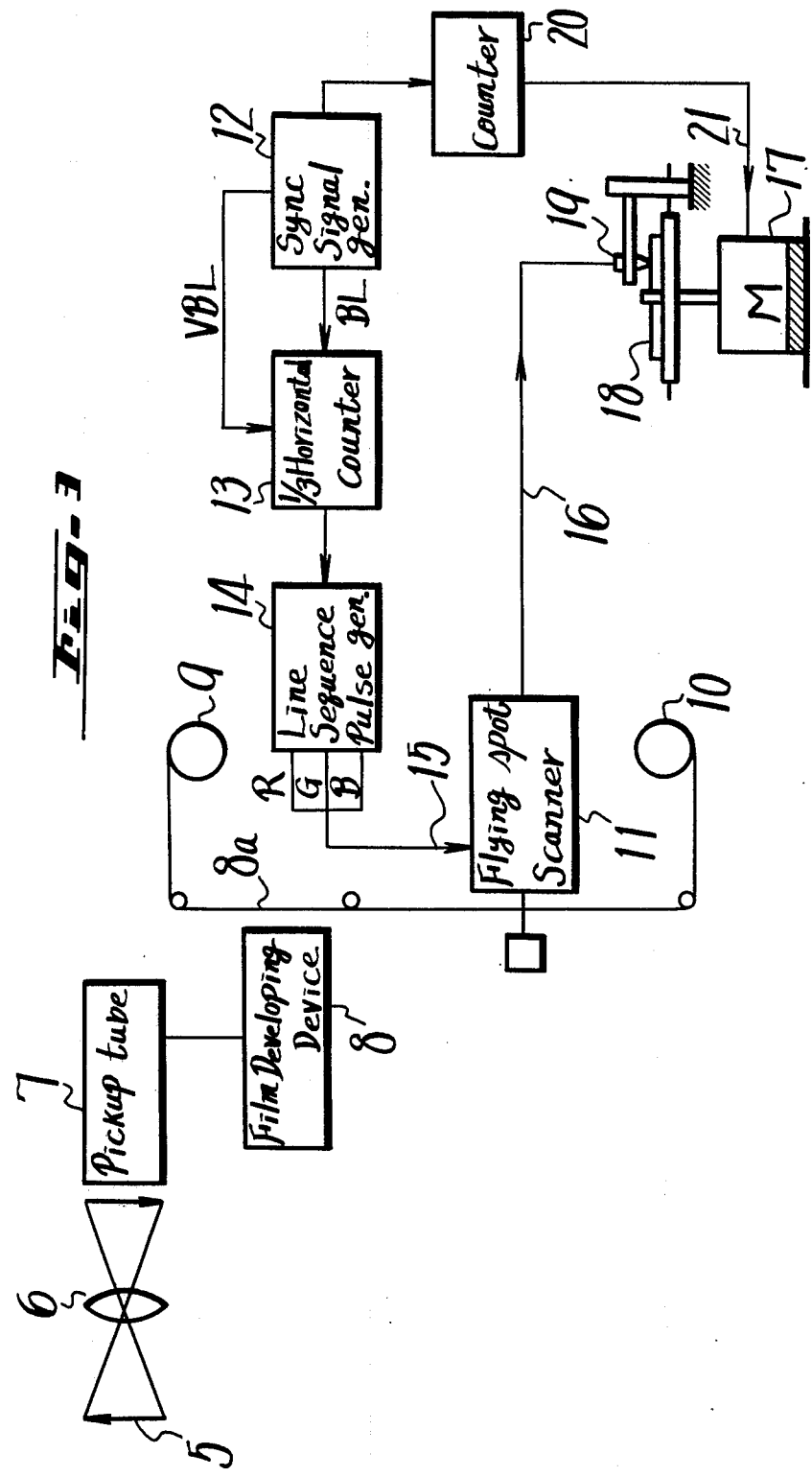

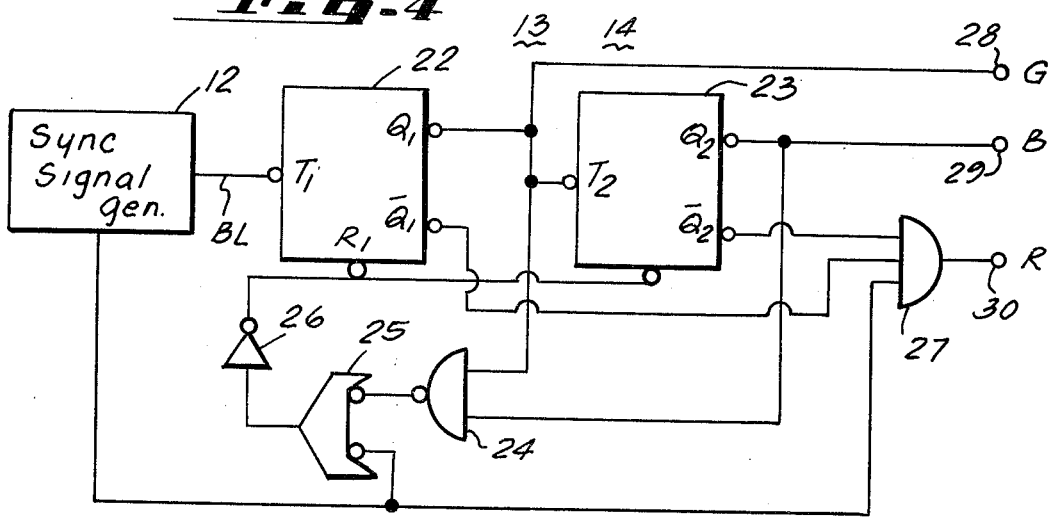
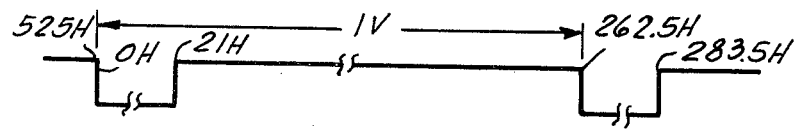
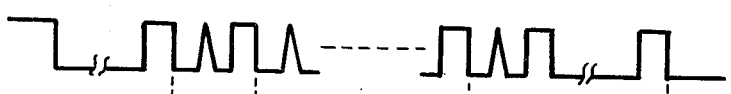
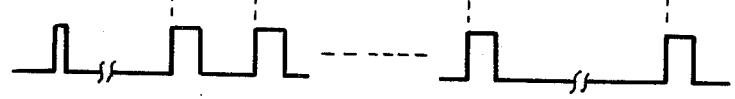
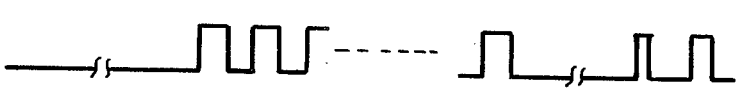
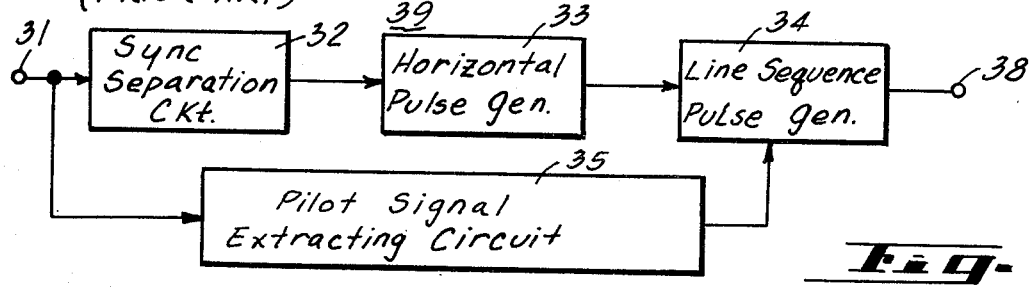
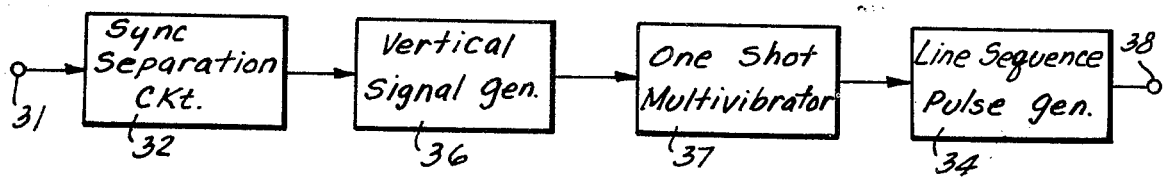

3,977,021

COLOR VIDEO DISC, APPARATUS FOR MAKING THE SAME AND REPRODUCING APPARATUS THEREFOR

BACKGROUND OF THE INVENTION

1. Field of the Invention

The present invention relates generally to a color video disc, and more particularly to a color video disc on which a color video signal and so on are recorded in a line sequence manner.

The present invention also relates generally to an apparatus for making the color video disc, and more particularly to an apparatus which records on the above color video disc the color video signal and so on in a line sequence manner by mechanically cutting the color video disc.

The present invention further relates to a reproducing apparatus for reproducing the recorded signals on the above color video disc which is simple in construction.

2. Description of the Prior Art

One type of prior art video discs has the drawback that a reproduced picture from the video signal recorded on the video disc is disturbed and that it is required to record thereon a starting pilot signal.

Accordingly, the prior art reproducing apparatus for the video disc is required to provide a pilot signal extracting circuit which is complicated in construction and expensive.

SUMMARY OF THE INVENTION

Accordingly, it is an object of the present invention to provide a color video disc which is free from the drawbacks encountered in the prior art.

It is another object of the invention to provide a color video disc with out a special pilot signal.

It is a further object of the present invention to provide an apparatus for making the color video disc.

It is a yet further object of the invention to provide a reproducing apparatus for reproducing the color video signal recorded on the color video disc.

The additional and other objects, features and advantages of the present invention will become apparent from the following description taken in conjunction with the accompanying drawing.

BRIEF DESCRIPTION OF THE DRAWING

FIG. 3 is a systematic circuit diagram of an example of apparatus according to the present invention for recording a synchronizing signal and a color video signal on the video disc by cutting;

FIG. 4 is a practical circuit diagram of an example of the line sequential pulse generator used in the embodiment shown in FIG. 3;

FIGS. 5A to 5E, inclusive, are waveform diagrams used for explaining the operation of the embodiment shown in FIG. 4;

FIG. 6 is a systematic circuit diagram of an example of the reproducing system according to the prior art; and FIG. 7 illustrates the reproducing system of the invention.

DESCRIPTION OF THE PREFERRED EMBODIMENT

Figure 1:
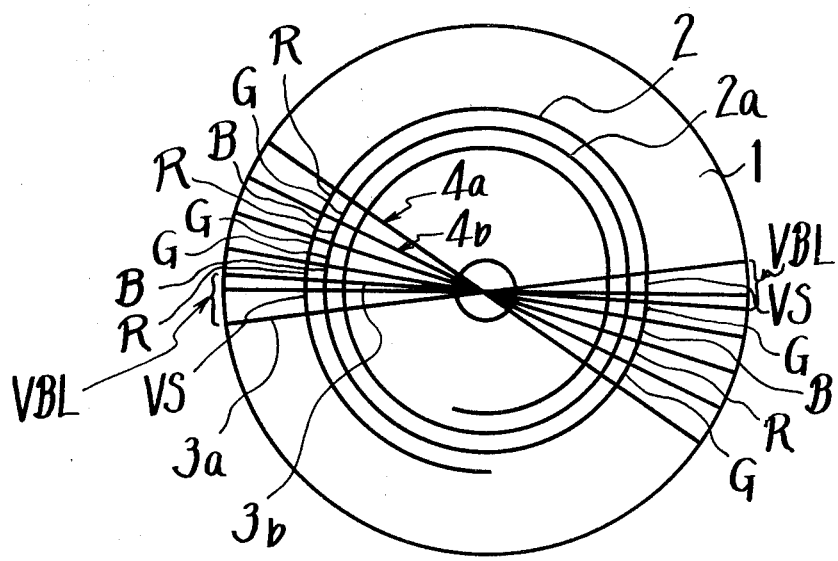
FIG. 1 is a plane view of a prior art video disc on which a synchronizing signal and a color video signal is recorded by cutting.

In order to better understand the present invention, a prior art color video disc will be now described with reference to FIG. 1.

In the figure, reference numeral 1 designates a color video disc proper which is about 0.1mm in thickness and about 20 to 30cm in diameter. On the color video disc 1 there is formed a spiral track 2 on one circle of which a signal corresponding to two fields is recorded. That is, a synchronizing signal component indicated by reference letters VS and a vertical retrace blanking signal VBL are recorded on the track 2 between lines 3a and 3b. After the vertical retrace blanking signal VBL, there is recorded a color video signal component in a line sequence manner such as red (R), green (G), blue (B), R, G, B, . . . . However, there are 625 of scanning lines in an European television system. Accordingly, in this case, if the video signal component is required to be recorded on the video disc 1 in a line sequence manner, the scanning lines of 625 can not be divided by 3 corresponding to the three colors or red, green and blue colors. Therefore, the blue, green and red color signal components B, G and R can not be arranged in order on the adjacent tracks 2 and 2a between lines 4a and 4b, 4b and 4c and between 4c and 4d as in the case of the color video disc 1 of the present invention shown in FIG. 2, but arranged at random as shown in FIG. 1. In other words, in the case where the red color signal component R is recorded on the track 2 between lines 4a and 4b in the prior art color video disc 1 shown in FIG. 1, it can not be always said that the color signal component recorded on the adjacent track 2 between lines 4a and 4b is always the red color signal component R, so that when the stylus carried by a pickup arm skips, for example, from the track 2 to the adjacent track 2a upon reproduction, another color signal component may be reproduced to disturb a reproduced picture. Further, since it is not clear in the prior art color video disc 1 of FIG. 1 which color signal component is recorded at the start of the first and second fields, a pilot signal for starting is necessarily required.

An example of the apparatus according to the present invention for making the color video disc 1 shown in FIG. 2 will be now described with reference to FIG. 3.

In FIG. 3, reference numeral 5 indicates an object the image of which is recorded. The object 5 is projected onto the photoelectric conversion plain of an image pickup tube 7 by a relay lens 6. The image of object 6 formed in the tube 7 is printed on a photographic film 8a which is stretched between supply and take-up reels 9 and 10 by a film developing device 8. The optical image printed on the film 8a is converted into an electric signal by a flying spot scanner 11 and the like disposed between the film supply and take-up reels 9 and 10, and then the signal including color signal components is recorded on a cutter disc 18 by cutting the same. At this time, a retrace blanking signal BL and a vertical retrace blanking signal VBL are derived from a synchronizing signal generator 12 included in the flying spot scanner 11 and then applied to a ⅓ horizontal counter 13. The output signal from the ⅓ horizontal counter 13 is applied to a line sequence pulse generator 14 which then produces three primary color or red, blue and green color signal components R, B and G in a line sequence manner. The output signal 15 from the line sequence pulse generator 14 is applied to the flying spot scanner 11. The output signal 16 from the flying spot scanner 11 (which is frequency-modulated) is applied to a cutter head 19. In order to synchronize a drive motor 17 for the cutter disc 18 with the signal applied to the cutter head 19, the output signal from the synchronizing signal generator 12 of the flying spot scanner 11 is counted down suitably by a counter 20 and the output signal 21 from the counter 20 is applied to the drive motor 17.

The ⅓ horizontal counter 13 and the line sequence pulse generator 14 will be now described in detail with respect to FIGS. 4 and 5. The retrace blanking signal BL derived from the synchronizing signal generator 12, which may be a horizontal drive signal, a horizontal synchronizing signal, a horizontal retrace blanking signal or the like, is applied to a first flip-flop circuit 22 at its trigger terminal $T_1$ the waveform of which is shown in FIG. 5B. The output signal from an acknowledge or enable output terminal $Q_1$ of the first flip-flop circuit 22 is used to drive a next stage flip-flop circuit 23 at its trigger terminal $T_2$. An acknowledge or enable output terminal $Q_2$ of the second flip-flop circuit 23 and the enable output terminal $Q_1$ of the first flip-flop circuit 22 are connected to input terminals of a NAND-circuit 24 the output signal of which is applied to one input terminal of a NOR-circuit 25 the other input terminal of which is supplied with the vertical retrace blanking signal VBL (shown in FIG. 5A) from the snchronizing signal generator 12. The output signal from the NOR-circuit 25 is applied through an inverter 26 to reset terminals $R_1$ and $R_2$ of first and second flip-flop circuits 22 and 23, respectively, to reset the latter. Thus, the first flip-flop circuit 22 produces at its enable terminal $Q_1$ a ⅓ counter output signal in snchronism with the vertical retrace blanking signal VBL as shown in FIG. 5C, Since the counter pulse shown in FIG. 5C is applied to the trigger terminal $T_2$ of the second flip-flop circuit 23 to trigger it at the trailing edge of the counter pulse shown in FIG. 5C, the second flip-flop circuit 23 produces at its hibit terminal $Q_2$ a pulse shown in FIG. 5D. Inhibit output signals from inhibit output terminals $\overline{Q_1}$ and $\overline{Q_2}$ of first and second flip-flop circuits 22 and 23 and the vertical retrace blanking signal VBL are applied to an AND-circuit 27, so that the AND-circuit 27 produces at its output terminal 30 an output signal with a waveform shown in FIG. 5E. The output signals or pulses obtained at terminals 28 and 29 which are connected to the enable terminals $Q_1$ and $Q_2$ of the first and second flip-flop circuits 22 and 23 and the output pulse at the output terminal 30 of the AND-circuit 27 are used as sampling pulses. A start pulse synchronized, with the vertical synchronizing signal is obtained as line sequence pulses, green (G), blue (B) and red (R), . . .

Figure 2:
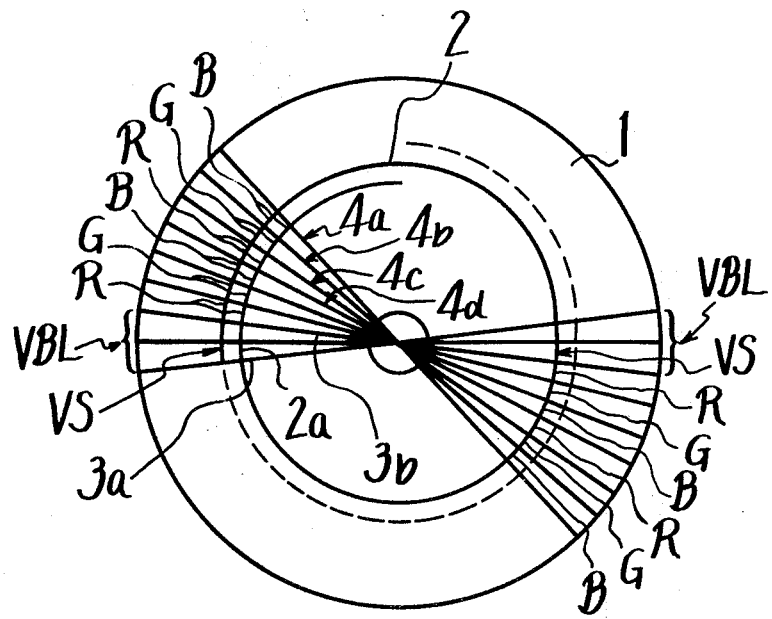
FIG. 2 is a plane view of an example of the color video disc according to the present invention on which a synchronizing signal and a color video signal are recorded by cutting.

The thus obtained line sequence color video signal is recorded by cutting on the cutter disc 18, then the cutter disc 18 with the color video signal is furnished to a stamper (not shown), and a number of color video discs, each of which is shown in FIG. 2, are manufactured by mechanical press techniques based upon the stamper.

An example of the apparatus according to the present invention for reproducing the color video signal recorded on the thus manufactured color video disc shown in FIG. 2 will be now described with reference to FIG. 6.

However, in order to better understand the reproducing apparatus of the invention, a prior art reproducing apparatus for the prior art color video disc shown in, for example, FIG. 1 will be firstly described with FIG. 6. With the prior art reproducing apparatus, the color video signal component reproduced by tracing the groove formed on the video disc with a pickup is applied to a signal processing system 39 at its input terminal 31. This reproduced signal is then delivered through a synchronizing separation circuit 32, a horizontal pulse generator circuit 33 and a line sequence pulse generator circuit 34 to an output terminal 38 of the signal processing system 39, and the reproduced video signal component is also applied through a pilot signal extracting circuit 35 to the line sequence pulse generator circuit 34, as shown in FIG. 6.

With such a prior art reproducing system, since it is necessary upon recording the color video signal and so on for the video disc to insert the pilot signal after the synchronizing signal as described above, the pilot signal extracting circuit 35 which is complicated in construction and expensive is necessary.

However, with the present invention since the first pulse after the synchronizing signal or the initial pulse of line sequence pulse of each field recorded on the color video disc shown in FIG. 2 is selected to be a predetermined color one, for example, the color red (R) without failure and hence there is no need to insert any pilot signal, it is sufficient that upon reproducing the signal from the synchronizing separation circuit 32 that it be applied as shown in FIG. 7 to a vertical pulse generator circuit 36. Then the output from the circuit 36 is applied to a one-shot multivibrator circuit 37 and the output from the multivibrator circuit 37 is applied to the line sequence pulse generator 34. That is, according to the present invention the video signal reproducing system can be made simple in construction because no pilot signal extracting circuit 35 which is complicated in construction and expensive is required.

The above description is given for only the preferred embodiments of the present invention, but it is not intended that the present invention be limited to the above described and shown embodiments. By way of example, more than two field synchronizing signals and color video signals can be recorded on the track of the color video disc in one circle and the first color video signal components in the respective fields are selected to be the same color.

It may be apparent that many modifications and variations could be effected without departing from the spirit and scope of the novel concepts of the present invention, so that the scope of the present invention should be determined by the appended claims.

We claim as our invention:

1. Apparatus for recording color video information in a spiral track on a disc wherein at least two field synchronizing signals and multiple color video signals are recorded on said spiral track of said video disc in a line sequential manner such that individual radii of said disc intersect the same type signals between the center and edge of said video disc such that individual ones of the synchronizing signals and the individual color video signals of said multiple color video signals have the same angular orientation on said disc, the first color video signal component of said multiple color video signals being used as a sync signal, comprising a signal generator means for producing said synchronizing signals, a ⅓ counter means for receiving said snchronizing signals and counting down said synchronizing signal by ⅓, a generator means receiving said counted down synchronizing signals and producing line sequency pulse signals, a flying spot scanner receiving and using said line sequence pulse signals as sampling pulses with for said color video signals and a cutting means receiving the output of said flying spot scanner for cutting said color video disc.

2. An apparatus as claimed in claim 1 in which a motor drives said color video disc and is controlled in speed by the output signal from said synchronizing signal generator through a counter means.

3. A reproducing apparatus for the color video disc as claimed in claim 1 comprising:
 a. means for picking up said signals recorded on said color video disc; and
 b. means for receiving said picked up signal and is producing said color video signals with said first color signal as a pilot signal.

* * * * *